Dec. 4, 1934.  D. HEYER  1,982,869

FLEXIBLE BELT AND METHOD OF MAKING IT

Filed April 15, 1931

Inventor:
Don Heyer

By John Flam
Attorney

Patented Dec. 4, 1934

1,982,869

UNITED STATES PATENT OFFICE 1,982,869

FLEXIBLE BELT AND METHOD OF MAKING IT

Don Heyer, Los Angeles, Calif., assignor to United States Electrical Manufacturing Company, Los Angeles, Calif., a corporation of California Application April 15, 1931, Serial No. 530,339

10 Claims. (Cl. 154—4)

My invention relates to improvements in flexible, laminated, endless belts and more especially to belts of the so-called V-type as used in variable speed transmission devices and power transmission mechanisms.

Previously known belts of trapezoidal cross-section have caused considerable trouble from "squashing" or excessive wedging action in the pulley groove due to inadequate cross-sectional rigidity. The result is excessive internal heat generation and loss of frictional torque due to distortion of the belt. This excessive heat also quickly destroys the belt, and its life is greatly shortened.

An object of my improved belt construction is to overcome excessive wedging in the pulley groove by inserting non-resilient members horizontally in the belt section. These inserts not only avoid "squashing" of the belt, but also tend to dissipate the heat generated by flexing of the belt over the pulleys. This allows the belt to be run at higher speeds with less heating and assures longer life.

Another object of my improved belt construction is to provide a belt that will have greater frictional torque and prevent slippage, by the horizontally spaced inserts coming in contact with the slots in the pulley members.

A further object of my improved belt construction is to provide a method of building up the laminations in a suitable mold and vulcanizing to the desired form.

My invention possesses other improvements and advantages over the present art and has objects which may be made more easily apparent from a consideration of one form of my invention. For this purpose I have shown one construction in the drawing which accompanies and forms a part of the present specification. I shall now proceed to describe this construction in detail which illustrates the general principles of my invention; but it is to be understood that this description is not to be taken in a limiting sense, since the scope of my invention is best defined by the appended claims.

Figure 1:
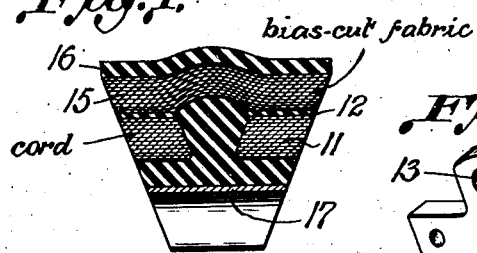
Figure 1 is a cross-sectional view taken as indicated by line 1—1 in Figure 4.
Figure 3:
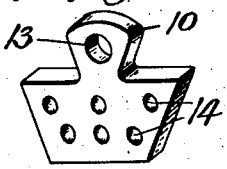
Figure 3 is a front elevation of the horizontal insert.
Figure 2:
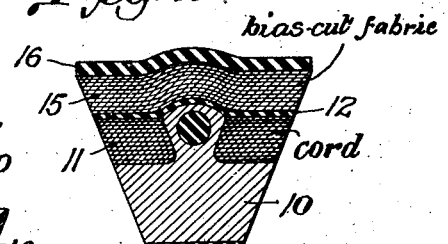
Figure 2 is a cross-sectional view taken as indicated by line 2—2 in Figure 4.
Figure 4:
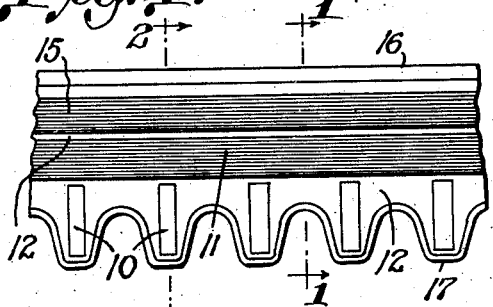
Figure 4 is a fragmentary side elevation of the belt.
Figure 5:
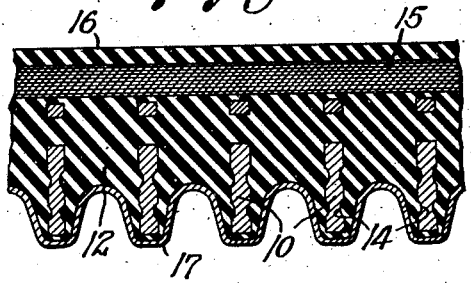
Figure 5 is a fragmentary sectional view taken longitudinally through the center of the belt.

Referring more in detail to the accompanying drawing, reference character 10 indicates the horizontal insert, preferably of a non-resilient, fibrous material. I place a number of these inserts equally spaced in a split, circular mold which forms a certain V angle. The mold is split to remove the finished belt and has equally spaced slots in the bottom of the V to hold the inserts in place during the process. The periphery of the mold should be the same as the desired outside length of the belt. Next, suitable cord material 11 is tightly wound around the inserts filling in the space between the inserts and the side of the V form as shown in Figures 1 and 2. Rubber or rubber composition 12 is molded in the V form up to a certain distance, binding the inserts and cord material together. Suitable hole 13 and depressions 14 in the inserts tend to secure same in place. Suitably prepared material, preferably bias-cut fabric 15 is wound on the rubber or rubber composition 12. This fabric is preferably of the width of the form at this point. Each succeeding layer is alternated from side to side of the form overlapping the edge of the preceding layer. In this manner the material is wound to finished form and does not require cutting and resultant waste. A cover of rubber 16 is placed over the fabric 15 and a compressing member of the mold is applied to firmly press the laminations together and vulcanizing them in place. This gives the belt a smooth, finished surface having the desired included angle.

The belt is removed from the mold at the proper time and a protective fabric cover 17 is applied to the inner circumference.

Figure 6:
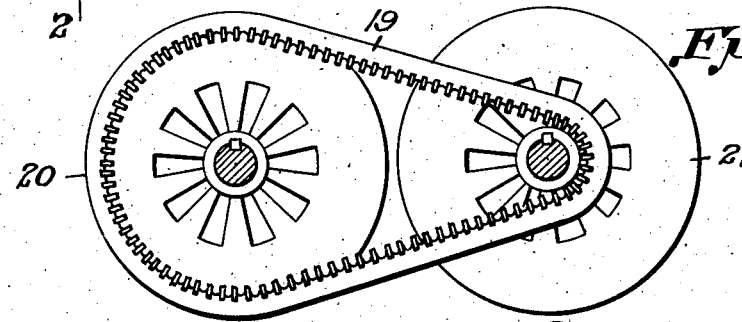
Figure 6 is a side elevation showing members of a variable speed transmission device with the belt positioned on said members.
Figure 7:
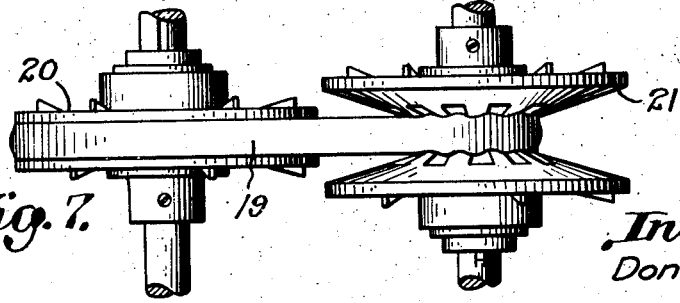
Figure 7 is a plan view showing the relative position of the belt to members of a variable speed transmission device.

In Figures 6 and 7, the finished belt is shown by character 19 in relative position on members 20 and 21 of a variable speed transmission device. Mechanisms of this nature are so arranged as to increase the effective diameter of one pair of pulley members while the effective diameter of the other pair of pulley members decrease. Considerable wear is caused on the belt due to the wedging action when shifted from one extreme to the other. When the belt is running on the minimum diameter of either pair of pulleys, the frictional surface is decreased and the belt slips unless kept tight. With my improved construction, the belt can be run fairly loose over the pulleys, as the inserts keep the belt from slipping. The action of the belt is shown in Figure 7 in exaggerated form, which I term a serpentine action. This makes the belt practically a positive drive. On the larger diameter, on account of the greater frictional surface, there is practically no slippage. However, the pulley members could be slotted for the entire effective surface, if necessary, to take advantage of the unique features of my belt.

I have also found, by experimentation with so-called V-belt drives using one or more V-belts running in V-grooves, that the belts soon "squash" in the pulley grooves and lose their true angle. This is especially true in multiple drives where I have found that several of the belts pull the entire load while the others run idle. With my improved belt, pulley contact is the same for all belts, regardless of number, when made by my method, the inserts maintaining the proper cross-sectional rigidity without distortion.

I claim:—

1. A flexible endless V belt, formed of horizontally-spaced inserts molded in the lower section, a center effective section of cord material wound longitudinally under tension, successive windings of alternate layers of bias-cut fabric, together with an outer layer of rubber, compressed and vulcanized to form.

2. A flexible endless V belt with a molded rubber section having a protective fabric cover on the inside periphery together with horizontally disposed inserts, a section of tightly wound cord material, and successive circumferential plies of bias-cut fabric covered with a layer of rubber and vulcanized to form.

3. A method of making flexible endless V belts which comprises forming a molded rubber section with inserts equally spaced at the inner periphery and horizontally arranged, together with layers of cord material, winding plies of bias-cut fabric circumferentially, covering with a layer of rubber, compressing the laminations and vulcanizing the unit to form.

4. A flexible endless V-belt, comprising a series of spaced rigid elements, having a configuration corresponding to the active belt surface, each of said elements having one or more cavities, and yielding material extending between and above the elements and keyed into said cavities.

5. A flexible endless V-belt, comprising a series of longitudinally spaced rigid elements, having a configuration corresponding to the active belt surface, each of said elements having a projection central thereof and arranged to extend outwardly with respect to the pulley seat in which the belt is to be accommodated, layers of fibrous material extending longitudinally of the belt and at one side of all of the projections, a similar set of layers extending longitudinally of the belt on the other side of all of the projections, and a yielding material extending between said elements and the projections and in the spaces not occupied by the said layers.

6. A flexible endless V-belt, comprising a series of longitudinally spaced rigid elements, having a configuration corresponding to the active belt surface, each of said elements having a projection central thereof and arranged to extend outwardly with respect to the pulley seat in which the belt is to be accommodated, layers of fibrous material extending longitudinally of the belt and at one side of all of the projections, a similar set of layers extending longitudinally of the belt on the other side of all of the projections, a yielding material extending between said elements and the projections and in the spaces not occupied by the said layers, and a series of layers of fabric superposed over the whole width of the elements and over the said projections and series of layers of fibrous material, said fabric layers extending longitudinally of the belt.

7. The combination as set forth in claim 5, in which the two series of layers of fibrous material are made up of cord material under longitudinal tension.

8. The combination as set forth in claim 6, in which the two series of layers of fibrous material are made up of cord material under longitudinal tension.

9. The method of making flexible endless V-belts, which comprises longitudinally spacing a series of rigid elements, having a configuration conforming with the active belt surfaces, winding cord material under tension over said spaced elements, filling the void between the elements and the cord material with a moldable yielding rubber composition, covering the cord material with layers of fabric, and vulcanizing the unit to the desired form.

10. A flexible endless V-belt, comprising a series of longitudinally spaced rigid elements, having a configuration conforming with the active belt surfaces, a series of layers of fibrous material over the elements, and yielding material extending into the spaces between the elements and the fabric, and forming cavities between the lower edges of the elements to provide a toothlike configuration at the inner side of the belt.

DON HEYER.